United States Patent
Belamaric et al.

(10) Patent No.: US 10,868,833 B2
(45) Date of Patent: *Dec. 15, 2020

(54) DNS OR NETWORK METADATA POLICY FOR NETWORK CONTROL

(71) Applicant: Infoblox Inc., Santa Clara, CA (US)

(72) Inventors: John Dominic Belamaric, Bethesda, MD (US); Soheil Eizadi, Portola Valley, CA (US); John Charles Voss, Redwood City, CA (US)

(73) Assignee: Infoblox Inc.

( * ) Notice: Subject to any disclaimer, the term of this patent is extended or adjusted under 35 U.S.C. 154(b) by 433 days.

This patent is subject to a terminal disclaimer.

(21) Appl. No.: 15/632,017

(22) Filed: Jun. 23, 2017

(65) Prior Publication Data

US 2018/0013793 A1    Jan. 11, 2018

Related U.S. Application Data (63) Continuation of application No. 14/806,476, filed on Jul. 22, 2015, now Pat. No. 9,736,185.

(60) Provisional application No. 62/150,792, filed on Apr. 21, 2015.

(51) Int. Cl.
*H04L 29/06* (2006.01)
*H04L 12/24* (2006.01)
*H04L 29/12* (2006.01)

(52) U.S. Cl.
CPC .............. *H04L 63/20* (2013.01); *H04L 41/20* (2013.01); *H04L 61/1511* (2013.01); *H04L 63/101* (2013.01); *H04L 63/105* (2013.01)

(58) Field of Classification Search
CPC ..... H04L 63/20; H04L 63/101; H04L 63/105; H04L 41/20; H04L 61/1511
See application file for complete search history.

(56) References Cited

U.S. PATENT DOCUMENTS

| | | |
|---|---|---|
| 6,826,698 B1 | 11/2004 | Minkin |
| 6,947,984 B2 | 9/2005 | Schweitzer |
| 7,272,853 B2 | 9/2007 | Goodman |
| 7,949,785 B2 | 5/2011 | Alkhatib |
| 8,005,981 B2 | 8/2011 | Tuck |

(Continued)

OTHER PUBLICATIONS

Author Unknown, Infoblox NIOS Software, Powering Nonstop Network Services, Whitepaper, Aug. 1, 2010.

(Continued)

*Primary Examiner* — Minh Dinh
(74) *Attorney, Agent, or Firm* — Van Pelt, Yi & James LLP (57) ABSTRACT

Techniques for configuring a network based on a Domain Name System (DNS) or network metadata policy for network control are disclosed. In some embodiments, a system, process, and/or computer program product for a DNS or network metadata policy for network control includes receiving a DNS or network metadata update at a DNS server (e.g., an authoritative or recursive DNS server) or an IP Address Management (IPAM) server, in which the DNS or network metadata update is determined to be relevant to the DNS or network metadata policy for network control; and sending the DNS or network metadata update to a network controller for a network, in which the network controller configures a plurality of network devices on the network based on the DNS or network metadata policy for network control.

14 Claims, 6 Drawing Sheets

(56) References Cited

U.S. PATENT DOCUMENTS

| | | | |
|---|---|---|---|
| 8,533,822 B2 | 9/2013 | Byrnes | |
| 8,621,556 B1 | 12/2013 | Bharali | |
| 8,869,237 B2 | 10/2014 | Byrnes | |
| 9,038,151 B1 | 5/2015 | Chua | |
| 9,178,807 B1 | 11/2015 | Chua | |
| 9,264,301 B1 | 2/2016 | Chua | |
| 9,276,877 B1 | 3/2016 | Chua | |
| 9,450,836 B2 | 9/2016 | Hammer | |
| 2013/0166703 A1* | 6/2013 | Hammer | H04L 41/50 709/220 |
| 2015/0334116 A1* | 11/2015 | Martini | H04L 61/1511 726/1 |
| 2016/0142251 A1* | 5/2016 | Contreras | H04L 41/0806 709/220 |
| 2016/0164825 A1* | 6/2016 | Riedel | H04L 61/1511 709/223 |

OTHER PUBLICATIONS

Author Unknown, Open Networking Foundation, Software-Defined Networking: The New Norm for Networks, ONF White Paper, Apr. 13, 2012.

Chandramouli et al., Secure Domain Name System (DNS) Deployment Guide, NIST Special Publication 800-81-2, Sep. 2013.

Hammad Kabir, Security Mechanisms for a Cooperative Firewall, Feb. 25, 2014.

Maryam Pahlevan et al., Signaling and Policy Enforcement for Co-operative Firewalls, Feb. 26, 2013.

Mckeown et al., OpenFlow: Enabling Innovation in Campus Networks, Mar. 14, 2008.

R. Atkinson, An Overview of the Identifier-Locator Network Protocol (ILNP), Sep. 30, 2005.

Yakomba Yavwa, The Firewall Technology, May 2, 2000.

\* cited by examiner

DNS OR NETWORK METADATA POLICY FOR NETWORK CONTROL

CROSS REFERENCE TO OTHER APPLICATIONS

This application is a continuation of co-pending U.S. patent application Ser. No. 14/806,476, entitled DNS OR NETWORK METADATA POLICY FOR NETWORK CONTROL filed Jul. 22, 2015 which is incorporated herein by reference for all purposes, which claims priority to U.S. Provisional Patent Application No. 62/150,792 entitled DNS OR NETWORK METADATA POLICY FOR NETWORK CONTROL filed Apr. 21, 2015, which is incorporated herein by reference for all purposes.

BACKGROUND OF THE INVENTION

A network policy is generally a policy that includes rules for computer network access. The network policy generally can be implemented by a network device to enforce a set of rules for computer network access. Example network devices include routers, switches, security devices, load balancers, and/or other network devices. Network devices can be physical, virtual, and/or Software-Defined Networking (SDN) devices.

Network devices, such as firewalls and routers, are typically configured with a policy that includes rules or routing Access Control Lists (ACLs). Firewall rules and routing ACLs are generally sensitive and complex elements of networked systems. Their sensitivity derives from the importance of hardening external access to a company's data center and enterprise networks. Their complexity generally derives from the wide array of network devices that may be in use in any company along with the rules logic in every network device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A network policy is generally a policy that includes rules for computer network access. The network policy generally can be implemented by a network device to enforce a set of rules for computer network access. Example network devices include routers, switches, security devices, load balancers, and/or other network devices. Network devices can be physical, virtual, and/or Software-Defined Networking (SDN) devices.

Network devices, such as firewalls and routers, are typically configured with a policy that includes rules and/or routing Access Control Lists (ACLs). Firewall rules and routing ACLs are generally sensitive and complex elements of networked systems. Their sensitivity derives from the importance of, for example, hardening external access to a company's data center and enterprise networks. Their complexity generally derives from, for example, the wide array of network devices that may be in use in any company along with the rules logic in every network device.

Network device performance often matches effective policies in importance. As an example, a poorly defined rule base or configuration mistakes can cause performance and security issues. Rules lists are often thousands of entries in length, which adds to the complexity for network/security administrators who are responsible for managing such rules and tracking change management of such rules and configurations.

What are needed are new and improved techniques for managing rules and configuration of network policies for network control.

Overview of Techniques for DNS and/or Network Metadata Policy for Network Control Accordingly, techniques for configuring a network based on a Domain Name System (DNS) and/or network metadata policy for network control are disclosed.

For example, a network policy, such as a DNS policy and/or a network metadata policy, can include rules/objects/sets of Internet Protocol (IP) addresses (e.g., an object can be configured/specified to include a set(s) of IP addresses) based on Fully Qualified Domain Names (FQDNs), DNS zones, DNS subzones, and/or DNS wildcards, such as further described below. The network policy can be applied by a DNS server/appliance (e.g., generally referred to hereinafter as DNS server) for a network (e.g., enterprise network) to implement/enhance the network policy for network control based on DNS-related information provided by the DNS server (e.g., based on DNS records/updates and/or associated metadata information maintained by the DNS server and/or an IP Address Management (IPAM) server, such as further described below).

A DNS server that is a source of authoritative DNS information generally has access to authoritative network information regarding the existence of an endpoint (e.g., a device) on a network, IP address changes, and/or other network information (e.g., as provided by a DNS server for the network that is authoritative, or a DNS server for the network that is passive such that it is also aware of such network information through recursive DNS information). In an example of a DNS or network metadata policy, the DNS or network metadata policy can include rules/objects for filtering/firewall rules for the network (e.g., implemented by security devices on the network) and/or Access Control Lists (ACLs) for routing for the network (e.g., implemented by routers/switches on the network). In some cases, the DNS policy can be for controlling access to an endpoint(s) (e.g., an SDN/OpenFlow policy to allow access to the endpoint(s) on an SDN/OpenFlow network) or defining specific network configuration data to be used by endpoint(s) to connect to a network.

As another example, a network policy that includes rules/objects based on network metadata (e.g., metadata associated with IP address(es), network Classless Inter-Domain Routing (CIDR) blocks, network ranges, DNS records, and/or DNS policies, etc.) can be applied by an IPAM server/appliance (e.g., generally referred to hereinafter as IPAM server) for a network (e.g., enterprise network) to implement/enhance the network metadata policy for network control based on the association between specific metadata and network information stored within the IPAM server (e.g., based on an IP address, network CIDR block, network range, DNS, DNS policy records/updates associated with the metadata maintained by the IPAM server).

An IPAM server that is a source of authoritative network metadata information generally has access to authoritative network information regarding the existence of an endpoint on a network, IP address changes, network CIDR block/range changes, DNS record changes, and/or other network information (e.g., as provided by an IPAM server, DNS server, or DHCP server for the network/IP Address/DNS records that can be linked to or managed by the IPAM server, configured by IT/network administrators, and/or updated through a programmatic interface or Application Programming Interface (API), such as a RESTful API). In an example of a network metadata policy, the network metadata policy can include rules/objects for filtering/firewall rules for the network (e.g., implemented by security devices on the network) and/or Access Control Lists (ACLs) for routing for the network (e.g., implemented by routers/switches on the network) based on arbitrary associations between user or system defined metadata such as application, application type, system location, tenant, end point group, application group, port group, and/or other associations between user or system defined metadata, and a set of network/DNS data. In some cases, the network metadata policy can be for controlling access to an endpoint(s) (e.g., an SDN/OpenFlow policy to allow access to the endpoint(s) on an SDN/OpenFlow network) or defining specific network configuration data to be used by an endpoint(s) to connect to a network.

Example use cases for applying the disclosed techniques for DNS or network metadata policy for network control include network configuration, enhanced network services, and/or security policy configuration/services, such as further described below. For example, the disclosed techniques for DNS or network metadata policy for network control can be applied to automatically configure network devices on an enterprise network based on DNS changes, DNS or network information associated with metadata changes, and/or other changes associated with IP addresses/ranges of IP addresses (e.g., if an FQDN, zone, subzone, or DNS wildcard is associated with a new IP address or a set of IP addresses including, for example, when an authoritative zone is accessed and the IP address of a server in the pool changes and when recursive DNS zones are accessed and an IP address of a server changes; if a new metadata/label is associated with a new IP address(es); if a Virtual Machine(s) (VM(s)) is added or removed that has an FQDN that is part of the zone/subzone/DNS wildcard match of the enterprise network, etc.), such as further described below.

In some embodiments, a system, process, and/or computer program product for a DNS or network metadata policy for network control includes receiving a DNS update at a DNS server (e.g., an authoritative or recursive DNS server) or an IP Address Management (IPAM) server, in which the DNS update is determined to be relevant to the DNS or network metadata policy for network control; and sending the DNS update to a network controller for a network, in which the network controller configures a plurality of network devices on the network based on the DNS or network metadata policy for network control. For example, the network controller can configure/control a plurality of network devices, such as physical, virtual, and/or SDN based routers, switches, load balancers, security/firewall devices, and/or other networking devices (e.g., that can implement a policy for allowing network access, routing network traffic, filtering network traffic based on rules, ACLs, zones, subzones, DNS wildcards, etc.), based on a DNS or network metadata policy for network control that includes a policy based on a Fully Qualified Domain Name(s) (FQDN(s)).

In one embodiment, the network device controller automatically configures the plurality of network devices on a heterogeneous network based on the DNS or network metadata policy for network control. For example, the plurality of network devices can include physical, virtual, or SDN based routers and/or switches, and the heterogeneous network can include network devices from a plurality of different vendors (e.g., Cisco Systems, Juniper Networks, EMC/VMware, and/or other vendors). In an example implementation, the DNS or network metadata policy can include access and/or routing rules/configurations for a router and/or switch based on a DNS wildcard. For example, the DNS or network metadata policy can include a rule-list based on FQDNs that match a particular DNS wildcard (e.g., including routing ACLs for a router). A rule can include an Access Control Entry (ACE) inside an ACL or a rule inside a DNS or network metadata policy (e.g., a network policy that includes a policy based on FQDNs that match a DNS wildcard). As an example, a rule can provide a description of a network flow and/or a filtering access (e.g., allow or deny, such as to allow/deny from <Source> to <Destination> for Service).

In one embodiment, the network device controller supports SDN-based devices (e.g., OpenFlow switches, etc.). For example, SDN is an approach that can be used to simplify computer networking. SDN allows network administrators to manage network services through abstraction of lower level networking functionality. Generally, this is implemented by decoupling the control plane (e.g., the system that makes decisions about where traffic is sent) from the data plane (e.g., the underlying systems that forward traffic to the selected destination). SDN generally provides a mechanism for the control plane to communicate with the data plane. OpenFlow is an example SDN standard that provides such a mechanism. Other mechanisms can also be used to allow for the control plane to communicate with the data plane.

In one embodiment, the network controller supports configuration and management of traffic flow routing (e.g., network layer-2 and/or network layer-3 traffic flow routing) in a heterogeneous network environment.

In one embodiment, the network controller facilitates network control in a heterogeneous network environment. For example, the heterogeneous network environment can include (next generation) network devices from a plurality of different vendors that can be configured/controlled using an SDN network controller (e.g., Cisco Systems, Juniper Networks, EMC/VMware, and/or other vendors).

The disclosed techniques for DNS or network metadata policy for network control/configuration are scalable and can support near real-time updates based on DNS or metadata information updates for network configuration/services (e.g., SDN network configuration/services). For example, such techniques can scale to millions of endpoints in a given network deployment. In an example implementation, such DNS or metadata propagation can also support near real-time DNS or metadata information updates for SDN network configuration/services, such as described herein.

In addition, the disclosed techniques for DNS or network metadata policy for network control/configuration are flexible. For example, such techniques can support DNS or network-related metadata (e.g., from an extensible IPAM solution, such as commercially available solutions/products from Infoblox, Inc. or other vendors) to facilitate a more flexible network policy for SDN network configuration/services, such as described herein.

As further described below, these and various other features and techniques are disclosed for DNS or network metadata policy for network control/configuration.

Overview of Activity for DNS/Network Metadata Policy for Network Control

Figure 1:
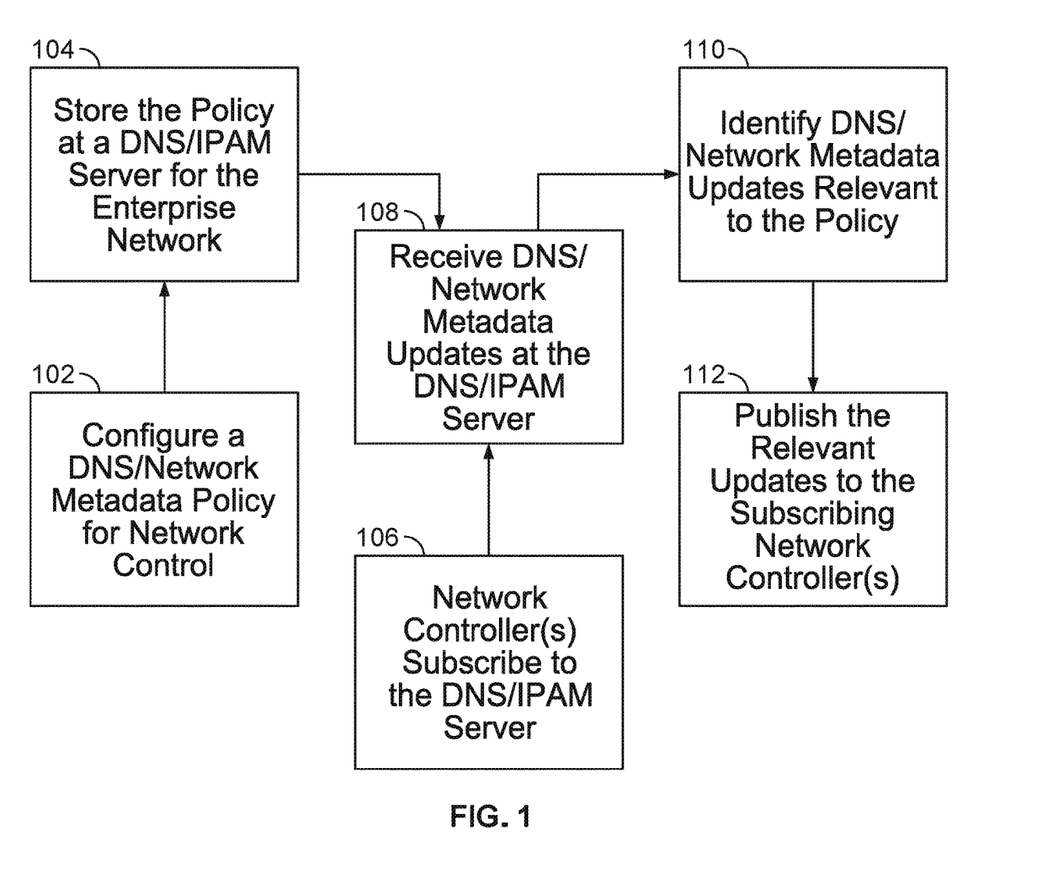
FIG. 1 is an activity diagram for a Domain Name System (DNS) or network metadata policy for network control in accordance with some embodiments.

FIG. 1 is an activity diagram for a Domain Name System (DNS) or network metadata policy for network control in accordance with some embodiments. As shown, a DNS or network metadata policy for network control is configured at 102. For example, an Information Technology (IT) administrator (admin) (e.g., network/security admin) can configure a network policy for an enterprise network (e.g., or other computing network environment), which can be input using an interface of a network controller. The DNS or network metadata policy can include various access/filtering configurations/rules (e.g., access, zone, and/or firewall configurations/rules) and routing configurations/rules (e.g., routing rules/ACLs) for the network devices on the enterprise network, including one or more rules based on a DNS wildcard (e.g., allow access to *.google.com, block access to bad-domain.com, route XYZ.com/host-1 to IP address A.B.C.D, etc.) or network metadata associated with a Network CIDR block/range (e.g., allow communication between servers attached to the Network CIDR block that corresponds to Application Group A, Data Center B, Rack 200 to the Network CIDR block that corresponds to Application Group B, Data Center B, Rack 201).

At 104, the DNS or network metadata policy is stored at a DNS or an IPAM server for the enterprise network. For example, the DNS server can be an authoritative DNS server for the enterprise network. As another example, the IPAM server can be a distinct server/appliance for IP address management for the enterprise network, such as implemented as a component of a commercial IPAM server (e.g., a commercially available IPAM server from Infoblox Inc. or another vendor) that supports associating metadata with network information in a network metadata policy, such as described herein.

At 106, a network controller(s) subscribes to the DNS server or the IPAM server to receive notifications on DNS updates or changes to the set of network data that is associated with specific metadata (e.g., network metadata). For example, the network controller(s) can be an SDN network controller that configures a plurality of network devices on the enterprise network, such as routers, switches, firewalls/security devices, load balancers, and/or other network devices on the enterprise network. In an example implementation, the network controller(s) communicates with the DNS or IPAM server via an Application Programming Interface(s) (API) (e.g., a REST API) and/or via a protocol (e.g., an open or proprietary messaging protocol or other network communication protocol).

At 108, the DNS server receives DNS updates, or the IPAM server receives network data/metadata configuration updates. For example, the DNS updates can include added or deleted IP addresses for an FQDN, zone, subzone, DNS wildcard, and/or other DNS updates (e.g., metadata information changes, malware domain identifications, etc.). As another example, IPAM server updates can include a change in a mapping of specific metadata to a set of IP addresses, a network CIDR block/range, and/or various other network metadata related updates.

At 110, the DNS server identifies DNS updates (e.g., if any) that are relevant to the DNS policy, or the IPAM server identifies network updates that are relevant to the network metadata policy. For example, if the DNS policy includes a rule for EXAMPLE-DOMAIN.com (e.g., the wildcard rule would be *.EXAMPLE-DOMAIN.com), then whether a DNS update exists relevant to EXAMPLE-DOMAIN.com can be determined. As another example, if the network metadata policy includes a rule for Application Group Finance Web (e.g., the rule would be update changes to network CIDR blocks matching Application Group Finance Web), then whether a network data update exists that is relevant to the Application Group Finance Web metadata association can be determined.

At 112, the DNS server publishes relevant DNS updates to the subscribing network controllers, or the IPAM server publishes relevant updates to the subscribing network controller(s). For example, if the DNS policy includes a rule for EXAMPLE-DOMAIN.com (e.g., the wildcard rule would be *.EXAMPLE-DOMAIN.com), and if the DNS updates included a DNS-related change relevant to EXAMPLE-DOMAIN.com, then the DNS server would report the DNS-related change relevant to EXAMPLE-DOMAIN.com to the subscribing network controller(s). For example if the network metadata policy includes a rule for Application Group Finance Web (e.g., the rule would be update changes to network CIDR blocks matching Application Group Finance Web), then the IPAM server would report the metadata-related change relevant to Application Group Finance Web to the subscribing network controller(s).

Figure 2:
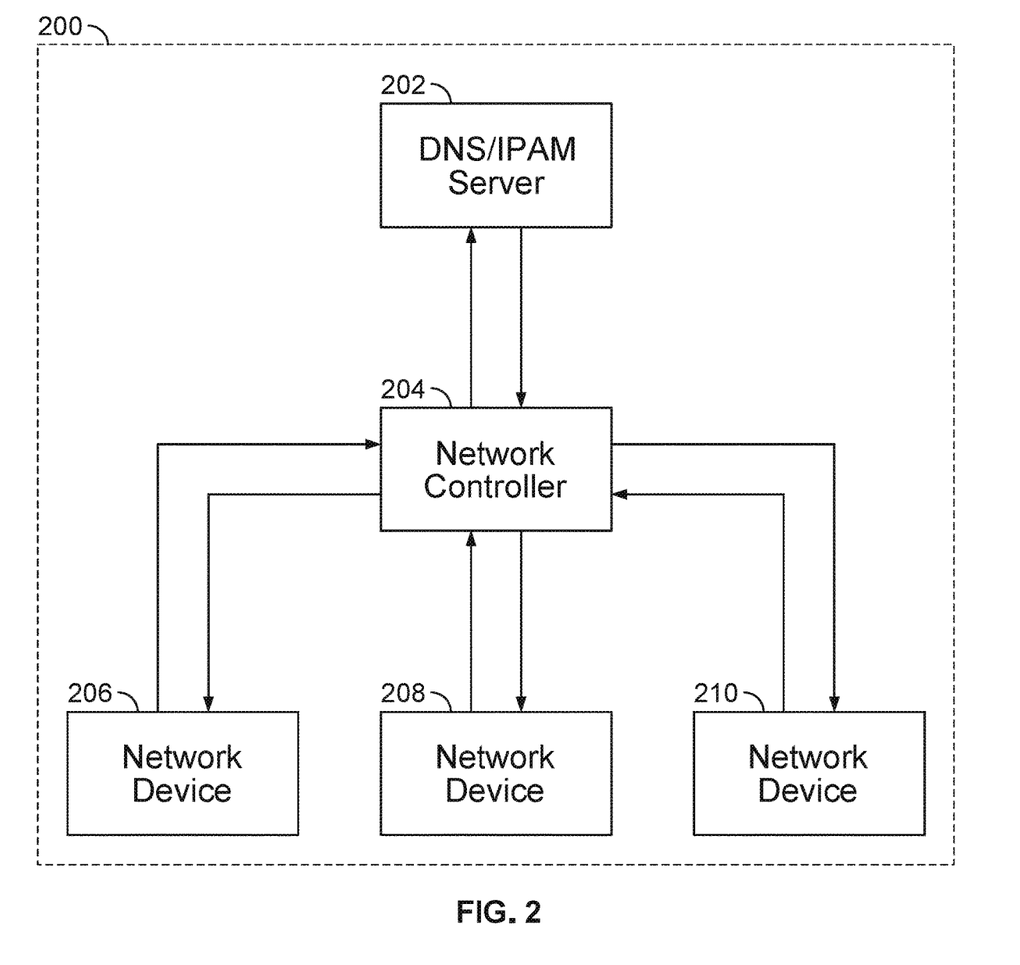
FIG. 2 is a network diagram illustrating a DNS or IP Address Management (IPAM) server in communication with a network controller for a network in accordance with some embodiments.

Example Network Architectures for DNS or Network Metadata Policy for Network Control FIG. 2 is a network diagram illustrating a DNS or an IP Address Management (IPAM) server in communication with network controllers for a network in accordance with some embodiments. As shown, DNS or IPAM server 202 for enterprise network 200 is in communication with a network controller 204. For example, the DNS server can be a commercially available DNS server from Infoblox Inc. or another vendor, or the IPAM server (e.g., a network metadata server) can be a commercially available IPAM server from Infoblox Inc. or another vendor. In one embodiment, the DNS server and the IPAM server can be implemented as distinct servers/components, such as described above. In one embodiment, the DNS server and the IPAM server are implemented as a DNS component and an IPAM component (e.g., network metadata component), respectively, of an integrated server/appliance. In one embodiment, the DNS server and the IPAM server are implemented as a virtual DNS server and a virtual IPAM server, respectively, that can be executed on a single physical server/appliance and/or on distinct physical servers/appliances.

As also shown, network controller 204 is in communication with network devices 206, 208, and 210 for enterprise network 200. For example, the network controller can be an SDN network controller. The network devices can be routers, switches, firewalls/security devices, load balancers, and/or other network devices that can implement network control based on a DNS or network metadata policy. As would be apparent to one of ordinary skill in the art, enterprise network 200 can include various other network devices, including physical, virtual, and/or SDN network devices. In one embodiment, DNS or IPAM server 202 and network controller 204 can implement the activity described above with respect to FIG. 1.

Example Systems for DNS or Network Metadata Policy for Network Control

Figure 3:
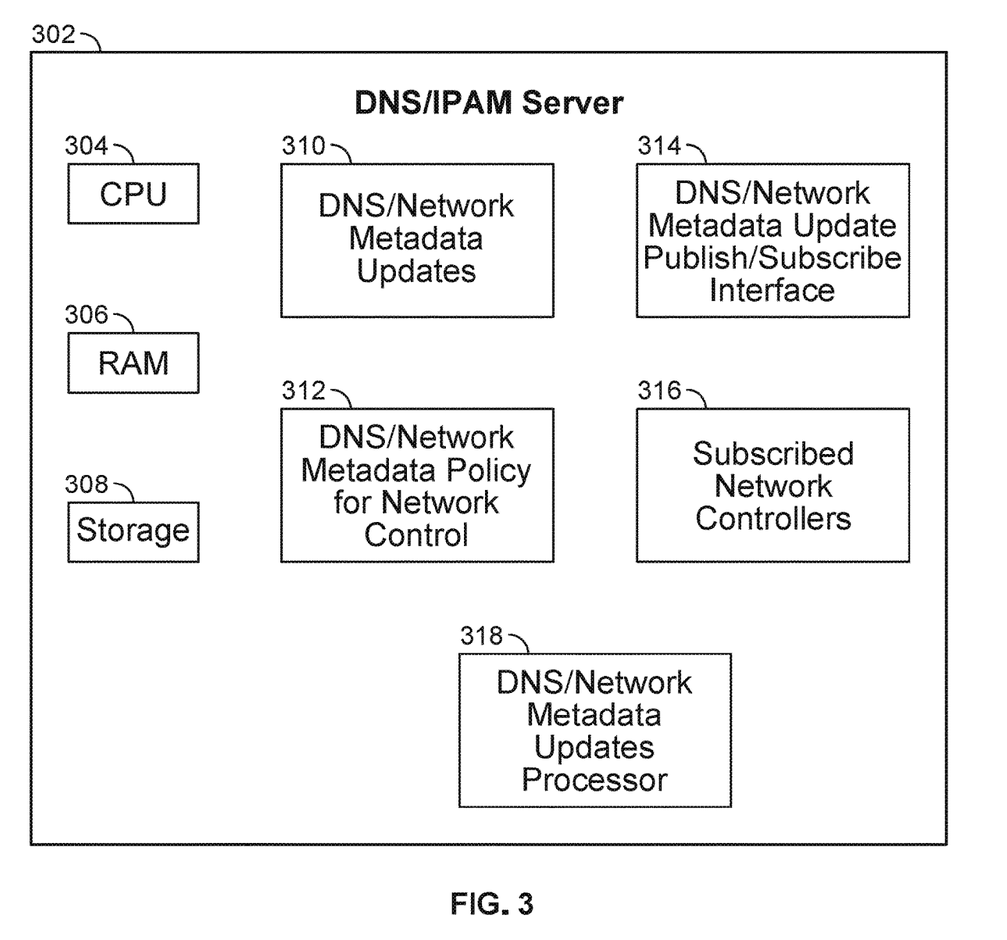
FIG. 3 is a component diagram illustrating a DNS or IPAM server in accordance with some embodiments.

FIG. 3 is a component diagram illustrating a DNS server or IPAM server in accordance with some embodiments. As shown, a DNS or IPAM server 302 includes a CPU 304, a RAM 306, and a data storage 308. As also shown, DNS or IPAM server 302 includes DNS or network metadata updates 310, a DNS or network metadata policy for network control 312, a DNS/network metadata update publish/subscribe interface 314, a subscribed network controllers 316 (e.g., a list of one or more network controllers stored in RAM 306 or storage 308, in which the network controllers are subscribed to receive DNS/network metadata updates from the DNS/IPAM server), and DNS/network metadata updates processor 318 (e.g., a software component executed on CPU 304), which are each further described below. In some implementations, one or more of these functions can be performed by another device or function, such as the DNS/network metadata updates processor can be performed (e.g., in-whole or in-part) using another device or function (e.g., all DNS updates can be communicated to subscribed network controllers, which can then perform that function to identify relevant DNS updates relevant to the DNS policy for network control; or all metadata updates can be communicated to subscribed network controllers, which can then perform that function to identify relevant metadata updates relevant to the network metadata policy for network control).

In one embodiment, DNS/IPAM server 302 implements the activity described above with respect to FIG. 1 and can also be used as DNS/IPAM server 202 for the enterprise network as described above with respect to FIG. 2. For example, DNS/network metadata updates 310 can be processed by DNS/network metadata updates processor 318 using CPU 304, RAM 306, and storage 308 to facilitate publishing relevant DNS/network metadata updates received by DNS/IPAM server 302 (e.g., an authoritative DNS server or authoritative IPAM server) to one or more subscribing network controllers that can then configure one or more network devices based on the DNS/network metadata updates, such as further described below. DNS/network metadata updates 310 (e.g., DNS/network metadata change notifications) can be stored in a data store (e.g., a separate or integrated data store) as also further described below.

In one embodiment, DNS/network metadata update publish/subscribe interface 314 provides a publish/subscribe interface or a query or outbound notification interface (e.g., an API or messaging protocol facilitating communications with a network controller(s) via a virtual/physical network interface of the DNS/IPAM server) for communications with network controllers, such as SDN controllers (e.g., using secure communications, in which communications between such network devices/elements are signed/verified using credentials, such as signed with a private key). For example, a publish/subscribe interface can be used to propagate DNS and/or network metadata updates (e.g., relevant DNS and/or network metadata updates) as similarly described herein (e.g., which is a more efficient approach than requiring SDN controllers to continually poll DNS or metadata servers for such DNS/network metadata changes, by allowing the SDN controllers to subscribe to updates of DNS records or metadata mappings that are relevant to network control/configurations implemented by such SDN controllers). As another example, a query interface can be used by an SDN controller to query a DNS or IPAM server for DNS or metadata updates and/or a current state of DNS/network metadata information stored on the DNS or IPAM server (e.g., to facilitate synchronization of such DNS/network metadata for the SDN controller based on the current data maintained by the (authoritative) DNS/IPAM server). As another example, an outbound notification interface (e.g., outbound RESTful API call or publishing a notification to a message bus such as AMQP) can be used by the DNS or IPAM server to propagate DNS and/or network metadata updates (e.g., relevant DNS and/or network metadata updates) as similarly described herein (e.g., enabling SDN controllers to receive updates of DNS records or metadata mappings that are relevant to network control/configurations implemented by such SDN controllers without having to subscribe to the DNS or IPAM server). In an example implementation, DNS updates can publish an entire set of DNS information and/or publish incremental DNS updates (e.g., source of DNS information and contents of DNS information, such as IP address A.B.C.D was added to DNS wildcard XYZ.com, etc.), or network metadata updates can publish an entire set of network information and/or publish incremental network information updates (e.g., network CIDR block A.B.C.D/24 was added to Application Group Web Finance) to one or more SDN controllers on an enterprise network.

Figure 4:
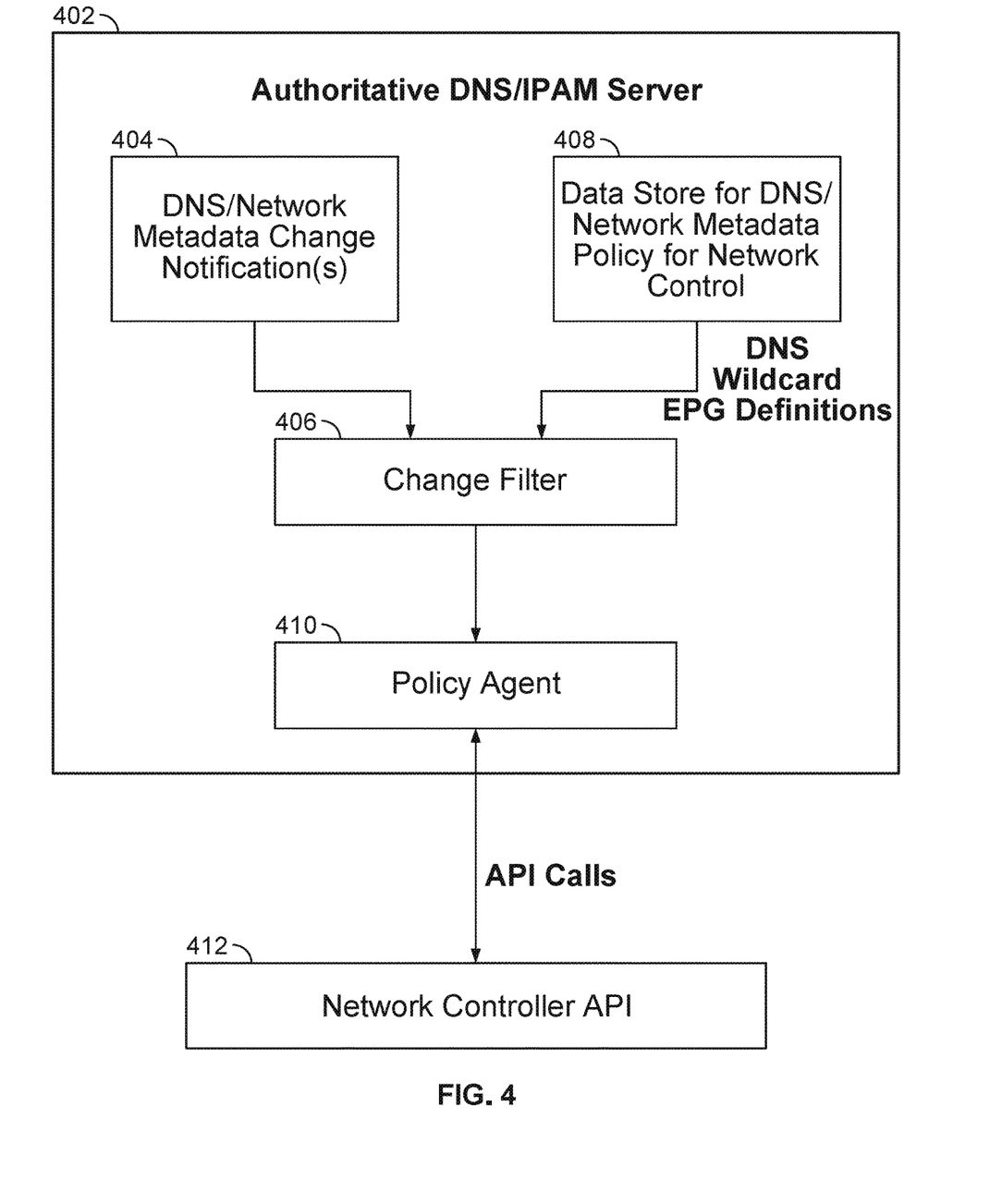
FIG. 4 is a diagram illustrating a DNS or IPAM server in communication with a network controller in accordance with some embodiments.

In an example implementation, DNS server 302 is an authoritative DNS server for an enterprise network. For example, the DNS server can be implemented using an Infoblox DNS server (e.g., a grid master DNS server for the enterprise network) or a DNS server from another vendor, which receives DNS updates 310 as DNS change notifications, such as further described below with respect to FIG. 4. DNS updates 310 can be stored in RAM 306 and/or storage 308 (e.g., or stored on a separate server/appliance or storage device). DNS policy for network control 312 can be a network policy that includes one or more rules/ACLs based on an FQDN(s). For example, the DNS policy for network control can be stored in a data store (e.g., a database, such as a relational database, object database, or another type of database) that is stored in RAM 306 and/or storage 308 (e.g., or stored on a separate server/appliance or storage device). DNS updates 310 (e.g., DNS change notification(s)) can be processed by DNS updates processor 318 (e.g., using a change filter 406 as shown in FIG. 4 and discussed below) that can determine DNS updates (if any) that match one or more rules/objects in DNS policy for network control 312, such as further described below. DNS update publish/subscribe interface 314 can then communicate the relevant DNS updates in the form of messages (e.g., Advanced Messaging Queue Protocol (AMQP) events using the AMQP standard protocol, as specified at https://www.amqp.org/; or using another open/standard or proprietary messaging protocol) or direct API calls (e.g., using a RESTful API(s)) to subscribed network controllers (e.g., SDN controllers) so that the subscribed SDN controllers can implement dynamic policy changes to the DNS policy(ies) based on such relevant DNS updates (e.g., based on DNS changes relevant to the DNS zones accessed by users in the enterprise network).

In another example implementation, IPAM server 302 is an authoritative IPAM server for an enterprise network. For example, the IPAM server can be implemented using an Infoblox IPAM server (e.g., an Infoblox grid master for the enterprise network) or an IPAM server from another vendor, which receives network metadata updates 310 as IPAM or Extensible Attribute change notifications, such as further described below with respect to FIG. 4. Network metadata updates 310 can be stored in RAM 306 and/or storage 308 (e.g., or stored on a separate server/appliance or storage device). Network metadata policy for network control 312 can be a network policy that includes one or more rules/ACLs based on changes to the data set mapped to a specific item of network metadata (e.g., Infoblox Extensible Attribute). For example, the network metadata policy for network control can be stored in a data store (e.g., a database, such as a relational database, object database, or another type of database) that is stored in RAM 306 and/or storage 308 (e.g., or stored on a separate server/appliance or storage device). Network metadata updates 310 (e.g., IPAM change notification(s) or Extensible Attribute change notification(s)) can be processed by network metadata updates processor 318 (e.g., using a change filter 406 as shown in FIG. 4 and discussed below) that can determine network metadata updates (if any) that match one or more rules/objects in network metadata policy for network control 312, such as further described below. Network metadata update publish/subscribe interface 314 can then communicate the relevant network data/network configuration updates in the form of messages (e.g., Advanced Messaging Queue Protocol (AMQP) events using the AMQP standard protocol, as specified at https://www.amqp.org/; or using another open/standard or proprietary messaging protocol) or direct API calls (e.g., using a RESTful API(s)) to subscribed network controllers (e.g., SDN controllers) so that the subscribed SDN controllers can implement dynamic policy changes to the network metadata policy(ies) based on such network CIDR block updates (e.g., based on network metadata changes relevant to the networks accessed by users in the enterprise network).

FIG. 4 is a diagram illustrating a DNS or IPAM server in communication with a network controller in accordance with some embodiments. In one embodiment, an authoritative DNS or IPAM server 402 is an example implementation of a DNS or IPAM server 302 of FIG. 3, DNS or IPAM server 202 of FIG. 2, and/or performs the DNS or IPAM server activity described above with respect to FIG. 1.

Referring to FIG. 4, DNS or IPAM server 402 is an authoritative DNS or IPAM server (e.g., Infoblox grid master DNS or IPAM server) for an enterprise network. For example, if DNS or IPAM server 402 is an authoritative DNS server for the enterprise network (e.g., for a given zone of the enterprise network), then the DNS server receives DNS updates (e.g., DNS changes), which can be used to facilitate the disclosed techniques for applying the DNS policy for network control by communicating the authoritative DNS updates that are relevant to the DNS policy to an SDN controller(s). In addition, DNS updates (e.g., DNS changes) can be received from a recursive DNS server (e.g., which caches such DNS updates as the forwarding or recursive server), and such DNS updates can similarly be used to facilitate the disclosed techniques for applying the DNS policy for network control by communicating such cached DNS updates that are relevant to the DNS policy to an SDN controller(s). In an example implementation, DNS server 402 can be implemented using an Infoblox DNS server (e.g., a grid master DNS server for the enterprise network) or a DNS server from another vendor, which receives DNS change notification(s) 404. As another example, if DNS or IPAM server 402 is an authoritative IPAM server for the enterprise network (e.g., for a network CIDR block of the enterprise network), then the IPAM server receives network metadata updates (e.g., IPAM changes), which can be used to facilitate the disclosed techniques for applying the network metadata policy for network control by communicating the network information that is relevant to the network metadata policy to an SDN controller(s). In addition, network configuration updates (e.g., IPAM changes, including network metadata changes/updates) can be received from an external system via an API, and such network configuration updates can similarly be used to facilitate the disclosed techniques for applying the network metadata policy for network control by communicating such network configuration updates that are relevant to the network metadata policy to an SDN controller(s). In an example implementation, IPAM server 402 can be implemented using an Infoblox IPAM server (e.g., a grid master server for the enterprise network) or an IPAM server from another vendor, which manages network configuration or network metadata changes 404.

As shown in FIG. 4, DNS or IPAM server 402 also includes a data store (e.g., a database or another type of data store) for a DNS or network metadata policy for network control 408. For example, the DNS or network metadata policy for network control can be a network policy that includes one or more rules/ACLs based on the set of IP addresses that matches a DNS wildcard.

As also shown in FIG. 4, DNS or network metadata change notification(s) 404 is processed by a change filter 406 to determine DNS or network metadata updates (if any) that are relevant to one or more rules/objects in DNS or network metadata policy for network control 408. For example, DNS wildcard End Point Group (EPG) definitions (e.g., to specify a set of IP addresses) can be applied by change filter 406 to filter DNS change notifications 404 to determine any DNS change notification(s) 404 that match one of the wildcards for one or more EPG definitions of DNS or network metadata policy 408. For instance, using the disclosed techniques, a user (e.g., IT/network admin) can define/enter DNS wildcards and an EPG name in the DNS server (e.g., in the NIOS of the Infoblox DNS server), the DNS server then automatically creates and populates the EPG with IP addresses, and the DNS server maintains EPG contents as DNS changes are made/received. As an example wildcard for an EPG definition, if the FQDN network policy includes a rule to allow access to www.google.com, then the wildcard for that rule can be specified as *.google.com.

DNS or network metadata change notification(s) 404 that are determined by change filter 406 to be relevant to one or more rules/objects in DNS or network metadata policy for network control 408 are communicated to a policy agent 410 as shown. For example, policy agent 410 can use DNS/network metadata update publish/subscribe interface 314 as described above with respect to FIG. 3 to communicate the relevant DNS or network metadata change notification(s) to a network controller (e.g., one or more (SDN) network controllers on the enterprise network).

As shown in FIG. 4, policy agent 410 communicates the relevant DNS or network metadata change notification(s) to a network controller API 412 using API calls (e.g., using a RESTful API(s)). In an example implementation, policy agent 410 communicates the relevant DNS or network metadata change notification(s) using an API (e.g., a RESTful API(s)) that is compatible with an industry standard or an open standard API, such as to communicate with a network controller API 412 implemented as a Cisco Application Policy Infrastructure Controller (APIC) Enterprise Module (EM) of the Cisco APIC controller provided by Cisco Systems, which facilitates communication with an SDN network controller(s) that can be used to configure/control network devices (e.g., routers/switches) provided by Cisco Systems. In another example implementation, policy agent 410 communicates the relevant DNS change notification(s) using another API that is compatible with an industry standard and/or another open standard API to facilitate communication with an SDN network controller(s) that can be used to configure/control network devices (e.g., routers/switches) provided by various other vendors (e.g., EMC/VMware, Juniper Networks, and/or other vendors).

In an example implementation, DNS or IPAM server 402 (e.g., an Infoblox Grid Master DNS or IPAM appliance/server executing NIOS on a processor/CPU or another DNS appliance/server) generates events based on DNS or network configuration changes that match specific metadata configured in the Infoblox Grid Master IPAM server. Change filter 406 identifies events of interest based on wildcards for FQDN(s) or changes in network data related to specific metadata relevant to the DNS or network metadata policy (e.g., DNS wildcard EPG definitions or network CIDR block to metadata mapping changes, such as similarly described herein). Policy agent 410 processes events and applies them to an APIC EM/controller (e.g., hereinafter referred to as APIC controller) that utilizes APIC EM northbound APIs.

In one embodiment, an IT/network admin (e.g., cloud admin) can configure one or more policies and pools on the APIC controller. For example, the IT/network admin can map metadata to corresponding network information, including to network properties such as to map a descriptive name for a set of one or more IP addresses (e.g., 10.10.10.0/24=HR Web Tier, 10.10.11.0/24=Engineering App Tier, etc.). The APIC controller can retrieve such network properties for workload from the authoritative DNS or IPAM server via a RESTful API (e.g., specified using parameters IP address, DNS server, default gateway, hostname, etc.) using metadata. In this example implementation, DNS records and DHCP fixed addresses can be automatically created in the authoritative DNS or IPAM server based on a network policy.

In one embodiment, a RESTful API is provided for communications between the network controller (e.g., APIC controller) and the DNS or IPAM server that can be used to retrieve network properties, and/or program DNS/DHCP based on metadata (e.g., tenant, app tier, app type, location, etc.).

The disclosed techniques for DNS or network metadata policy for network control can be applied to various use case scenarios, including network configuration, enhanced network services, and/or security, such as will now be described.

Example Use Case Scenario—SDN Controller Integration for Network Policy Update Automation An example use case scenario for applying the disclosed techniques for DNS or network metadata policy for network control is to enable policy definitions in an SDN controller(s) for an enterprise network (e.g., an SDN controller that exclusively configures/controls network devices, such as routers, switches, load balancers, firewalls, and/or other network devices). For example, the SDN controller(s) can be implemented as a Cisco APIC controller (e.g., including the Cisco APIC Enterprise Module (EM)), also referred to herein as APIC controller (e.g., to provide Cisco ACI integration for DDI automation), as similarly described above. As another example, the SDN controller can be implemented as an Open Daylight controller, VMware NSX controller, or any other SDN network controller, which is in communication with the DNS server via API(s), messages using a messaging protocol, and/or a plug-in(s). In particular, DNS or network metadata policy for network control is applied in this use case scenario to enable policy definitions in the SDN controller(s) for the enterprise network based on DNS wildcard(s) and/or other network metadata assignment(s), rather than just on statically defined IP subnets/address ranges.

In this example use case scenario, relevant DNS change notifications are communicated from an authoritative DNS or IPAM server (e.g., Infoblox grid master IPAM or DNS server for the enterprise network) to the APIC controller to update physical and virtual network device configuration based on IP address changes in the authoritative IPAM or DNS server (e.g., IP address changes that trigger events in the NIOS of the grid master). For example, the authoritative IPAM or DNS server can notify the APIC controller on detection of a change to a DNS zone/wildcard so that firewalls/load balancers/switch port ACLs can be updated (e.g., if another host is added to *.google.com, APIC can add the IP address of that host to the firewall/load balancer/switch port ACL after receiving notification from the authoritative DNS server). As another example, the authoritative IPAM or DNS server can notify the APIC controller on detection of a change to a set of IPs that matches a particular network metadata (e.g., if a new subnet is added in NIOS for port group X, then the APIC can update the firewall/load balancer accordingly). As yet another example, the IPAM or DNS server can detect a new IP address that is relevant to a Virtual Private Network (VPN) policy, and the authoritative IPAM or DNS server can notify the APIC controller so that the new IP address can be added to the VPN configuration based on the DNS or IPAM update/change.

As such, this example use case scenario facilitates automation and visibility of IP address and network CIDR block/range assignments in the APIC controller. This example use case scenario also automates and provides visibility in the authoritative IPAM or DNS server on IP address assignments made through the APIC controller. In addition, this example use case scenario automates IPAM or DNS record creation for elements orchestrated through the APIC controller.

Example Use Case Scenario—SDN Controller Integration for Security

Another example use case scenario for applying the disclosed techniques for DNS or network metadata policy for network control is to enable integration with SDN controller(s) for an enterprise network to block and/or quarantine an IP address and/or MAC address when the authoritative DNS server detects an end device (e.g., a host device, such as a server or client computing device on the enterprise network) is contacting a malicious site (e.g., a site associated with malware, such as a web site that is a known bad network domain as the web site was detected to be associated with downloaded malware and/or command-and-control (CnC) botnet activity, etc.). For example, the SDN controller(s) can be implemented as a Cisco APIC controller, also referred to herein as APIC controller (e.g., to provide Cisco ACI integration for security), as similarly described above.

In this example use case scenario, DNS or network metadata policy for network control is applied in this use case scenario to enable the authoritative DNS server to notify the APIC controller of an IP address and/or MAC address to block and/or quarantine. For example, a DNS firewall component (e.g., Infoblox DNS Firewall module installed on an Infoblox DNS server) can notify the APIC controller when a DNS query to a malicious site (e.g., a malware domain/web site) is detected. In response, the APIC can automatically modify ACL(s), fabric, and/or firewall(s) to block or quarantine a host associated with the DNS query to the malicious site.

Additional Use Case Scenarios

As another example use case scenario, an ACL on a switch port is generally based on IP addresses and not based on a DNS zone, subzone, or wildcard. So, if an ACL policy is based on DNS (e.g., a DNS policy includes an ACL policy based on a DNS entry/FQDN, DNS zone, subzone or DNS wildcard), an SDN network controller (e.g., an APIC controller or another SDN controller) will effectively need to translate that DNS entry or DNS wildcard to the IP address(es) associated with the DNS entry/DNS wildcard in order to configure/program the ACL on the switch port. Assume that a user (e.g., IT/network admin) makes a DNS change to add, remove, or change IP addresses (e.g., based on the authoritative DNS server), then the ACL on the switch port would also need to be updated assuming such DNS changes were relevant to the ACL policy on the switch port.

As similarly described above, the disclosed techniques facilitate an automatic configuration of the switch port based on the DNS change as the DNS server can publish relevant DNS updates to subscribing SDN network controllers, which implement network policies based on FQDN, such as an ACL that implements the policy based on FQDN(s) that can be rendered to IP addresses based on such DNS updates. As an example, if an FQDN network policy allows access to google.com, and the google.com network domain maps to 50 different IP addresses, and another IP address is added to that network domain, then the ACL can be updated to include that additional new IP address to allow access to the google.com network domain, which is mapped to those 51 IP addresses using the disclosed techniques.

In an example implementation, the DNS server includes a generic event mechanism that is integrated into an operating system/platform of the DNS server (e.g., NIOS of an Infoblox DNS server) to allow an SDN controller(s) to subscribe to events based on a set of criteria (e.g., an FQDN wildcard match relevant to a DNS policy implemented by the SDN controller(s)) and to execute a task (e.g., perform a notification action) when that set of criteria has been determined, such as similarly described herein. For example, the operating system/platform executed on the DNS server can perform one or more of the following: (1) match (whenever an A record added to *.EXAMPLE.com)->action (send outbound API call to APIC controller to add the IP address for that A record to a given EPG/contract); (2) match (whenever an A record is removed from *.google.com)->action (send outbound API call to APIC controller to remove the IP address for that A record to a given EPG/contract); match (DNS Firewall blocked query detected from IP range x)->action (send outbound API call to APIC controller to add ACL for that IP to a specific EPG/contract); (4) match (DNS Firewall blocked query detected from IP range x)->Action (send outbound API call to APIC controller to move specific IP to a different "quarantined" EPG). In some cases, the above match criteria can be entered by a user (e.g., IT/network admin, such as an authorized DNS server/NIOS user) to define matches. In some cases, the DNS server can retrieve EPGs, endpoints, and contracts from the SDN controller(s) and use these in automatically defining matches/actions. For example, the above match criteria and actions can be automatically determined by the DNS server based on FQDNs or DNS wildcards specified in the DNS policy(ies) (e.g., if a rule/object includes an FQDN or DNS wildcard, then DNS updates relevant to the FQDN or DNS wildcard can be automatically determined to be relevant DNS updates to communicate to the DNS controller(s), such as similarly described herein).

In one embodiment, IPAM information stored on the IPAM server includes key-value pairs for network metadata association with IPAM records/entries (e.g., associating a label with an IP address/subnet). For example, such network metadata can be stored in a data store on the network metadata server and/or a separate IPAM server (e.g., such as provided by an authoritative IP Address Management (IPAM) system, which is generally a master of the IPAM data for the network, such as provided by Infoblox Inc. or another vendor). As similarly described above, relevant network metadata can also be included in network metadata updates communicated to the SDN controller(s), such that any metadata association with IPAM data can similarly be propagated for use in the disclosed techniques for network metadata policy for network control/configuration. As an example, an EPG, such as data center 1 for an enterprise network such as ACME.com, can be associated with a set of IP addresses in the ACME enterprise network. If an IP address is added, deleted from data center 1, then that network metadata update can be propagated, such that a network policy based on metadata data center 1 can be updated to reflect that IP address change (e.g., a network policy for ACLs for data center 1 or another network metadata policy).

Example Processes for DNS or Network Metadata Policy for Network Control

Figure 5:
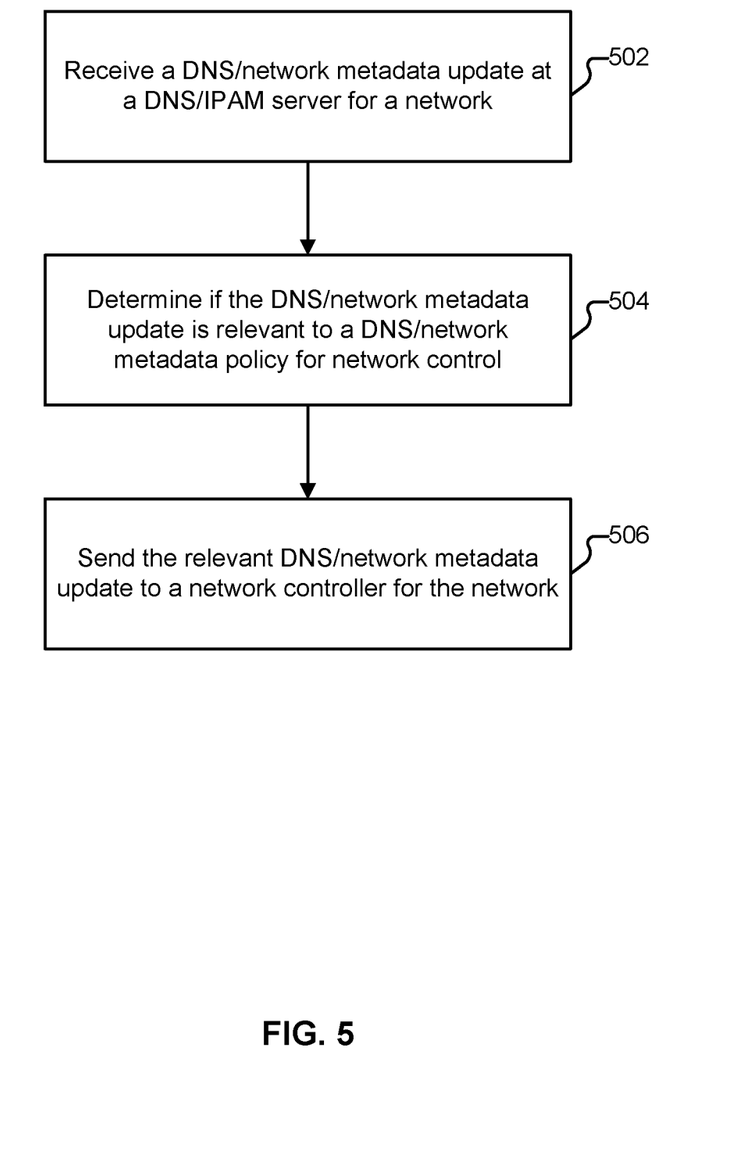
FIG. 5 is a flow diagram illustrating a process for configuring a network based on a DNS or network metadata policy for network control in accordance with some embodiments.

FIG. 5 is a flow diagram illustrating a process for configuring a network based on a DNS or network metadata policy for network control in accordance with some embodiments. In one embodiment, the process is performed by a DNS or an IPAM server, such as the activity and DNS or IPAM server described above with respect to FIGS. 1-4.

Referring to FIG. 5, At 502, a DNS or network metadata update is received at a DNS or IPAM server for a network. For example, a DNS update can be received at a DNS server for an enterprise network (e.g., an authoritative DNS server or recursive DNS server), or a network metadata update can be implemented at an IPAM server for the enterprise network (e.g., an authoritative IPAM server).

At 504, the DNS or network metadata update is determined to be relevant to a DNS or network metadata policy for network control/configuration. For example, the DNS update can be determined to be an IP address addition, deletion, and/or change that matches a DNS wildcard specified in the DNS or network metadata policy, such as similarly described above. As another example, the network metadata update can be determined to be a network CIDR block addition, deletion, and/or change that matches a metadata association specified in the DNS or network metadata policy, such as similarly described above.

At 506, the relevant DNS or network metadata update is sent to a network controller for the network. For example, the network controller can be an SDN controller that configures a plurality of network devices on the enterprise network based on the DNS or network metadata policy for network control. For example, the SDN controller can configure/control a plurality of network devices, such as physical, virtual, and/or SDN based routers and/or switches, based on a DNS or network metadata policy for network control that includes a policy based on a DNS wildcard or metadata association such as similarly described above.

Figure 6:
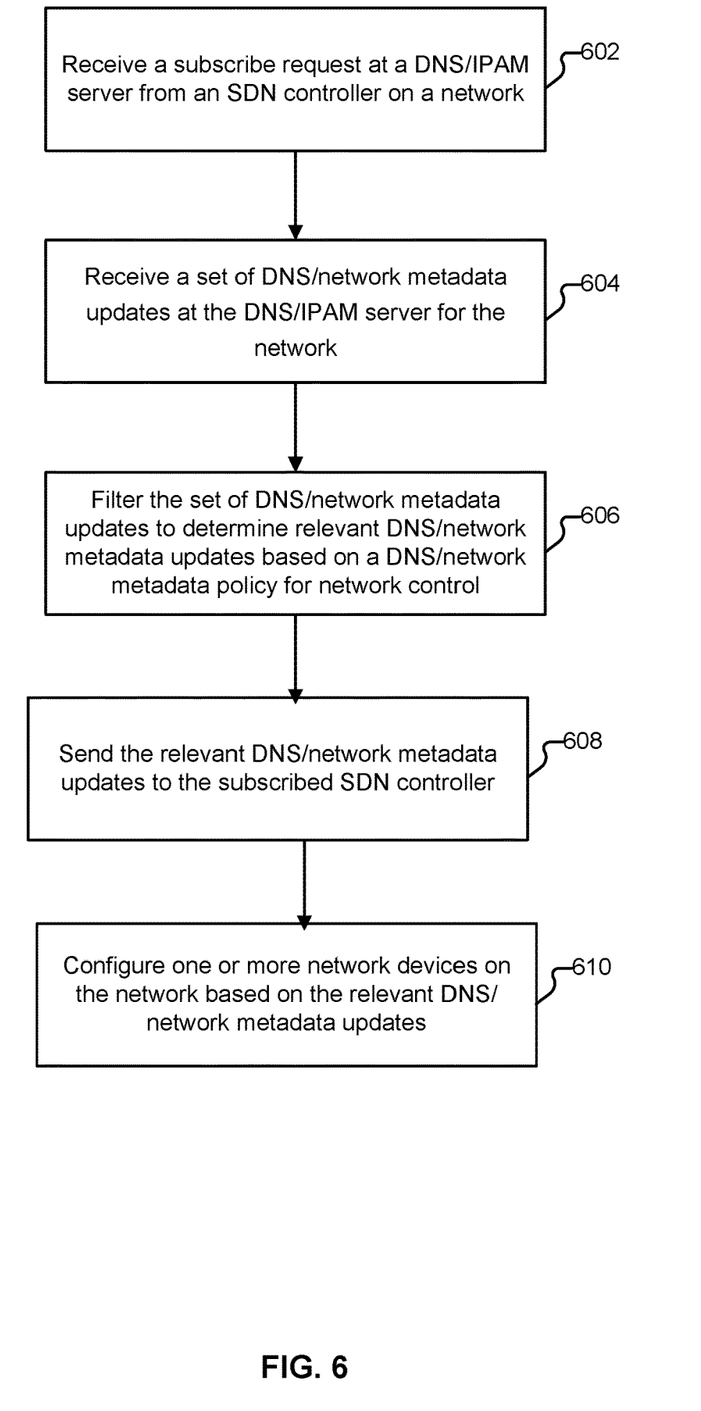
FIG. 6 is another flow diagram illustrating a process for configuring a network based on a DNS or network metadata policy for network control in accordance with some embodiments.

FIG. 6 is another flow diagram illustrating a process for configuring a network based on a DNS or network metadata policy for network control in accordance with some embodiments. In one embodiment, the process is performed by a DNS or an IPAM server, such as the activity and DNS or IPAM server described above with respect to FIGS. 1-4.

At 602, a subscribe request is received at a DNS or IPAM server from an SDN controller on a network. For example, the DNS or IPAM server can support a publish/subscribe interface for communications with the SDN controller(s) on the network (e.g., enterprise network), such as similarly described above.

At 604, a set of DNS or network metadata updates is received at the DNS or IPAM server for the network. For example, a DNS update can include various types of DNS changes (e.g., IP address to DNS record association changes, DNS metadata changes, identification of malware domains, etc.), such as similarly described above. As another example, a network metadata update can include various types of IPAM or network metadata changes (e.g., changes in the associations between metadata and a set of IP addresses, network CIDR Block/Ranges, DNS records, etc.).

At 606, the set of DNS or network metadata updates is filtered to determine relevant DNS or network metadata updates based on a DNS or network metadata policy for network control. For example, a DNS wildcard can be used to execute a filter operation to identify relevant DNS updates, such as similarly described above, or a match to a specific item of metadata can be used to execute a filter operation to identify relevant network configuration updates.

At 608, the relevant DNS or network metadata updates are sent to the subscribed SDN controller. For example, the DNS or IPAM server and the subscribed SDN controller can communicate via an API and/or messages via a messaging protocol, such as similarly described above.

At 610, the subscribed SDN controller configures one or more network devices on the network based on the relevant DNS or network metadata updates. For example, the SDN controller can configure a router, switch, firewall, load balancer, and/or another network device based on the relevant DNS or network metadata updates, such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a Domain Name System (DNS) or network metadata policy for network control, comprising:
   a processor of a DNS or an IP Address Management (IPAM) server configured to:
      receive DNS or network metadata updates at the DNS or IPAM server;
      identify, from the DNS or network metadata updates, at least one DNS or network metadata update relevant to the DNS or network metadata policy for network control, wherein the DNS or network metadata policy for network control includes a policy based on Domain Name System (DNS) zones, subzones, DNS wildcards, or any combination thereof or metadata associated with network configuration data including network CIDR blocks, network ranges, IP addresses, DNS records, or any combination thereof, and wherein the at least one DNS or network metadata update includes one or more of the following: an IP address addition, an IP address deletion, and/or an IP address change relevant to the policy or the metadata; and
      send the at least one relevant DNS or network metadata update to a network controller for a network, wherein the network controller configures a plurality of network devices on the network based on the DNS or network metadata policy for network control, wherein the sending of the at least one relevant DNS or network metadata update comprises to:
         perform one or more of the following:
            send an outbound API call to the network controller to add an access control list associated with an IP address to a set of IP addresses relevant to the policy or the metadata; and/or
            send an outbound API call to the network controller to move a specific IP address from a first set of IP addresses relevant to the policy or the metadata to a second set of IP addresses relevant to the policy or the metadata; and
   a memory coupled to the processor and configured to provide the processor with instructions.

2. The system of claim 1, wherein the network controller is a Software Defined Networking (SDN) network controller, and wherein the plurality of network devices includes physical, virtual, or SDN based routers and/or switches.

3. The system of claim 1, wherein the plurality of network devices includes physical, virtual, or Software Defined Networking (SDN) based routers and/or switches, and wherein the network includes network devices from a plurality of different vendors.

4. The system of claim 1, wherein the DNS server is an authoritative DNS server or a recursive DNS server.

5. The system of claim 1, wherein the network controller subscribes to the at least one relevant DNS or network metadata update from the DNS or IPAM server.

6. The system of claim 1, wherein the DNS or IPAM server publishes the at least one relevant DNS or network metadata update to the network controller.

7. The system of claim 1, wherein the DNS or IPAM server communicates with the network controller via a messaging protocol.

8. The system of claim 1, wherein the sending of the at least one relevant DNS or network metadata update comprises to:
perform the following:
send an outbound API call to the network controller to add an access control list associated with an IP address to a set of IP addresses relevant to the policy or the metadata; and
send an outbound API call to the network controller to move a specific IP address from a first set of IP addresses relevant to the policy or the metadata to a second set of IP addresses relevant to the policy or the metadata.

9. A method for a Domain Name System (DNS) or network metadata policy for network control, comprising:
receiving DNS or network metadata updates at a DNS or IP Address Management (IPAM) server;
identifying, from the DNS or network metadata updates, at least one DNS or network metadata update relevant to the DNS or network metadata policy for network control, wherein the DNS or network metadata policy for network control includes a policy based on Domain Name System (DNS) zones, subzones, DNS wildcards, or any combination thereof or metadata associated with network configuration data including network CIDR blocks, network ranges, IP addresses, DNS records, or any combination thereof, and wherein the at least one DNS or network metadata update includes one or more of the following: an IP address addition, an IP address deletion, and/or an IP address change relevant to the policy or the metadata; and
sending the at least one relevant DNS or network metadata update to a network controller for a network, wherein the network controller configures a plurality of network devices on the network based on the DNS or network metadata policy for network control, wherein the sending of the at least one relevant DNS or network metadata update comprises:
performing one or more of the following:
sending an outbound API call to the network controller to add an access control list associated with an IP address to a set of IP addresses relevant to the policy or the metadata; and/or
sending an outbound API call to the network controller to move a specific IP address from a first set of IP addresses relevant to the policy or the metadata to a second set of IP addresses relevant to the policy or the metadata.

10. The method of claim 9, wherein the DNS server is an authoritative DNS server or a recursive DNS server.

11. The method of claim 9, wherein the network controller is a Software Defined Networking (SDN) network controller, wherein the plurality of network devices includes physical, virtual, or SDN based routers and/or switches, and wherein the network includes network devices from a plurality of different vendors.

12. A computer program product for a Domain Name System (DNS) or network metadata policy for network control, the computer program product being embodied in a tangible non-transitory computer readable storage medium and comprising computer instructions for:
receiving DNS or network metadata updates for a DNS or IP Address Management (IPAM) server;
identifying, from the DNS or network metadata updates, at least one DNS or network metadata update relevant to the DNS or network metadata policy for network control, wherein the DNS or network metadata policy for network control includes a policy based on Domain Name System (DNS) zones, subzones, DNS wildcards, or any combination thereof or metadata associated with network configuration data including network CIDR blocks, network ranges, IP addresses, DNS records, or any combination thereof, and wherein the at least one DNS or network metadata update includes one or more of the following: an IP address addition, an IP address deletion, and/or an IP address change relevant to the policy or the metadata; and
sending the at least one relevant DNS or network metadata update to a network controller for a network, wherein the network controller configures a plurality of network devices on the network based on the DNS or network metadata policy for network control, wherein the sending of the at least one relevant DNS or network metadata update comprises:
performing one or more of the following:
sending an outbound API call to the network controller to add an access control list associated with an IP address to a set of IP addresses relevant to the policy or the metadata; and/or
sending an outbound API call to the network controller to move a specific IP address from a first set of IP addresses relevant to the policy or the metadata to a second set of IP addresses relevant to the policy or the metadata.

13. The computer program product recited in claim 12, wherein the DNS server is an authoritative DNS server or a recursive DNS server.

14. The computer program product recited in claim 12, wherein the network controller is a Software Defined Networking (SDN) network controller, wherein the plurality of network devices includes physical, virtual, or SDN based routers and/or switches, and wherein the network includes network devices from a plurality of different vendors.

* * * * *

UNITED STATES PATENT AND TRADEMARK OFFICE
CERTIFICATE OF CORRECTION

PATENT NO. : 10,868,833 B2
APPLICATION NO. : 15/632017
DATED : December 15, 2020
INVENTOR(S) : Belamaric et al.

Page 1 of 1

It is certified that error appears in the above-identified patent and that said Letters Patent is hereby corrected as shown below:

On the Title Page

Item (73), assignee, address, insert --Santa Clara, CA (US)--, therefor.

Signed and Sealed this
Fifth Day of July, 2022

Katherine Kelly Vidal
*Director of the United States Patent and Trademark Office*